US00RE33886E

United States Patent [19]

Ullman et al.

[11] E Patent Number: Re. 33,886

[45] Reissued Date of Patent: Apr. 14, 1992

[54] METHOD OF FORMING A TAMPER EVIDENT SEALING LINER

[76] Inventors: Myron E. Ullman, 120 Sleepy Hollow, Canfield, Ohio 44406; Milton Kessler, 6690 Harrington Ave., Youngstown, Ohio 44512

[21] Appl. No.: 479,927

[22] Filed: Feb. 14, 1990

Related U.S. Patent Documents

Reissue of:

[64] Patent No.: 4,822,326
Issued: Apr. 18, 1989
Appl. No.: 180,948
Filed: May 27, 1988

U.S. Applications:

[62] Division of Ser. No. 87,191, Aug. 20, 1987, Pat. No. 4,754,890.

[51] Int. Cl.[5] ..... B31B 1/60; B21D 51/46

[52] U.S. Cl. ..... 493/77; 493/79; 413/9; 413/64

[58] Field of Search ..... 493/346, 347, 382, 963, 493/78, 77, 79, 80, 81, 100, 108

[56] References Cited

U.S. PATENT DOCUMENTS

| | | | |
|---|---|---|---|
| 756,601 | 4/1904 | Doremus . | |
| 3,546,768 | 12/1970 | Acton et al. . | |
| 3,632,004 | 1/1972 | Grimes et al. | 215/349 |
| 3,817,417 | 6/1974 | Edwards | 215/37 R |
| 3,942,782 | 3/1976 | Hermach | 493/346 |
| 3,973,719 | 8/1976 | Johnson et al. | 229/5.6 |
| 4,047,473 | 9/1977 | Fletcher et al. . | |
| 4,127,187 | 11/1978 | Smith | 206/219 |
| 4,155,439 | 5/1979 | Fletcher et al. . | |
| 4,199,646 | 4/1980 | Hori et al. . | |
| 4,209,126 | 6/1980 | Elias | 229/43 |
| 4,227,624 | 10/1980 | Hawkins . | |
| 4,324,343 | 4/1982 | Moller | 220/270 |
| 4,328,905 | 5/1982 | Hardt | 220/359 |
| 4,341,498 | 7/1982 | Ellis | 413/9 |
| 4,396,655 | 8/1983 | Graham et al. . | |
| 4,418,831 | 12/1983 | Schellenberg | 220/258 |
| 4,452,842 | 6/1984 | Borges et al. . | |
| 4,503,123 | 3/1985 | Ou-Yang . | |
| 4,523,689 | 6/1985 | Laub | 215/232 |
| 4,544,080 | 10/1985 | Wright et al. . | |
| 4,556,152 | 12/1985 | Bogren | 220/276 |
| 4,588,099 | 5/1986 | Diez . | |
| 4,588,465 | 5/1986 | Paciorek . | |
| 4,605,136 | 8/1986 | Debetencourt | 215/232 |
| 4,625,875 | 12/1986 | Carr et al. . | |
| 4,666,052 | 5/1987 | Ou-Yang | 215/230 |
| 4,684,554 | 8/1987 | Ou-Yang . | |
| 4,746,387 | 5/1988 | Wright et al. . | |

FOREIGN PATENT DOCUMENTS

| | | |
|---|---|---|
| 2327161 | 5/1977 | France . |
| 282689 | 8/1952 | Switzerland . |
| 480238 | 12/1969 | Switzerland . |

*Primary Examiner*—James G. Smith
*Assistant Examiner*—Jack Lavinder

[57] ABSTRACT

A tamper evident safety seal is formed from a sealing liner having an integral tab portion, the tab being double folded for increased strength.

12 Claims, 3 Drawing Sheets

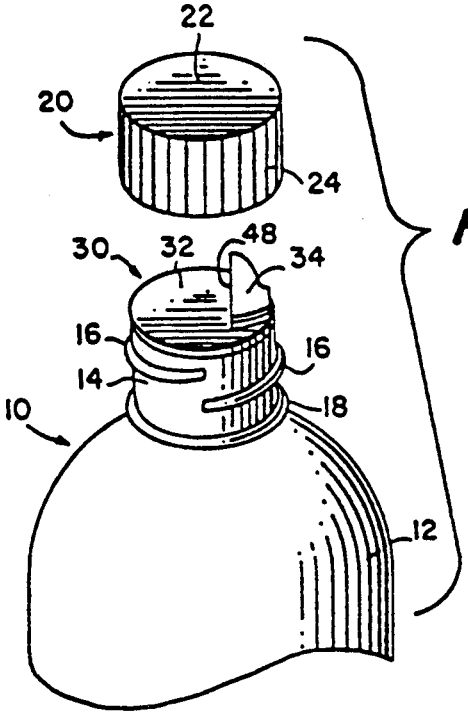
FIG. 1.
FIG. 2.
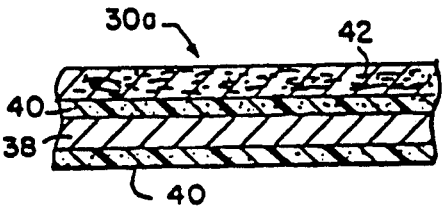
FIG. 3a.
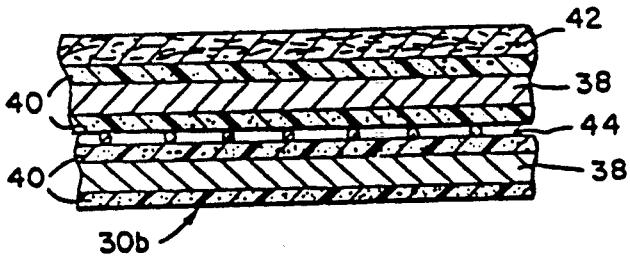
FIG. 3b.
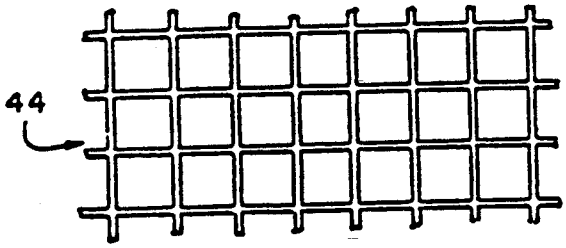

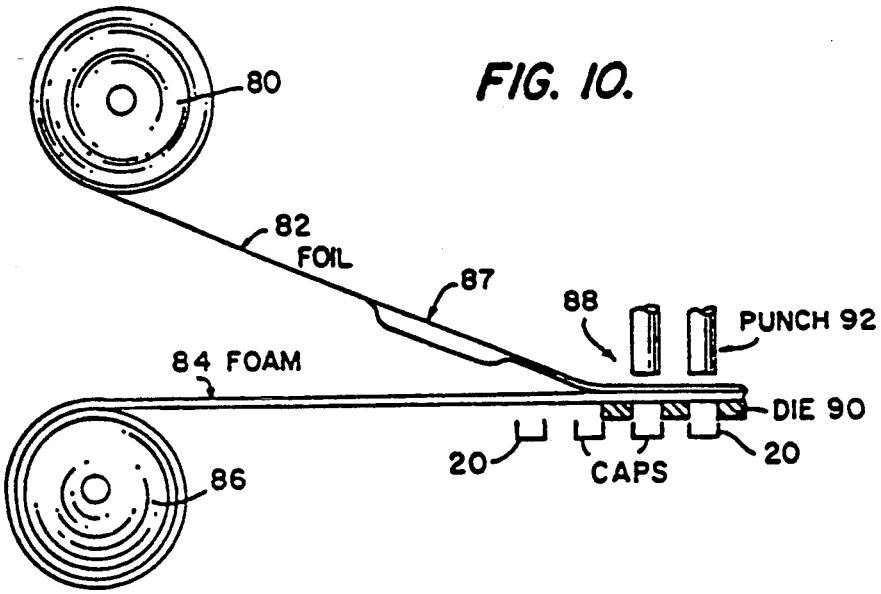
FIG. 10.
FIG. 11a.
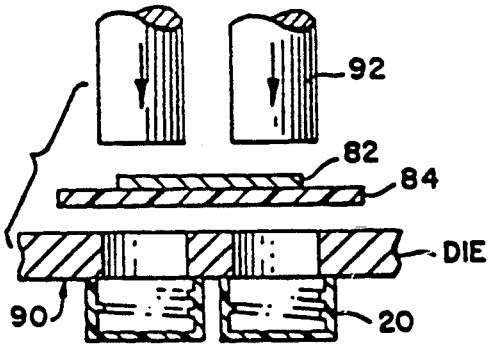
FIG. 11b.
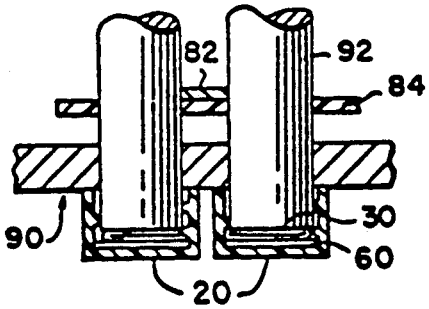
FIG. 12.
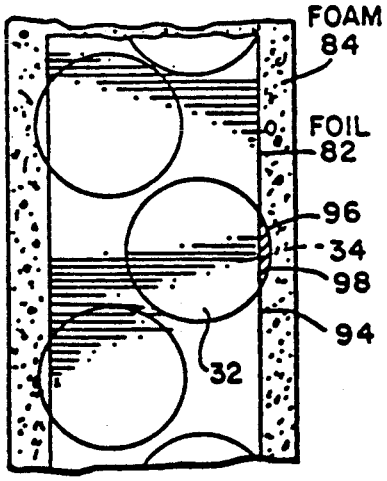

METHOD OF FORMING A TAMPER EVIDENT SEALING LINER

Matter enclosed in heavy brackets [ ] appears in the original patent but forms no part of this reissue specification; matter printed in italics indicates the additions made by reissue.

This is a division of application Ser. No. 087,191 filed Aug. 20, 1987 now U.S. Pat. No. 4,754,890.

FIELD OF INVENTION

The present invention relates to improvements in the sealing of bottles; and, more particularly, the invention relates to an improved tamper evident safety seal for bottles, having an integral pull tab.

BACKGROUND OF THE INVENTION

Aluminum foil seals are in common use for sealing the mouths of bottles, especially bottles containing consumable products such as pharmaceuticals, food products, etc. The aluminum foil seal is adhered to the upper end of the bottle neck, which defines the mouth of the bottle, immediately following the filling of the bottle with the consumable product in question. These common seals accomplish two important functions, i.e. they first serve to ensure that no foreign material has entered the bottle after it has been filled with the intended product, and they second serve to prevent purposeful tampering, because access to the interior of the bottle cannot be achieved without destroying the seal.

These aluminum foil seals are available in a number of forms, including aluminum foil coated with polymer, and polymer coated aluminum foil laminated to paper. The polymer coating serves to facilitate adherence of the seal to the edge of the bottle neck such as by heat welding. The bottles commonly used are plastic bottle, although it is also possible to use a glass bottle with a polymer coated neck end. Such seals are also available coated with special polymer which will even adhere to uncoated glass.

A major problem of these prior seals is they are extremely difficult for the consumer to remove from the mouth of the bottle. There is nothing of which the consumer can grab hold in an attempt to remove the seal. Consequently, the consumer usually must use a tool such as a knife, or merely poke a finger through the seal. This in turn results in a second problem, i.e. the flexible aluminum seal is not completely removed from the edge of the bottle neck, and it is therefore ragged around the opening making it difficult to remove the product.

Solutions have been proposed including the formation of tabs along the edge of the seal which project beyond the neck of the bottle to help facilitate removal of the seal through grasping by the user. In one form, which has now been largely discarded by the art, a plurality of small protuberances are provided about the periphery, but these protuberances by necessity are no greater than the depth of the bottle screw threads so as to prevent such protuberances from becoming welded to the bottle cap or interfering with the screw threads. However, tabs or protuberances of that size are not of an adequate length to be easily grasped by the consumer, and therefore this solution to the problem has not proven successful.

It has also been proposed to use a bell shaped tab folded on top of the aluminum seal. This expedient provides a partial solution to the problem in that the bell shaped tab is sufficiently large so that it can be grasped by the consumer and will usually have sufficient strength so as to permit removal of the seal from the bottle. However, sometimes the seal will tear leaving the consumer with either insufficient remaining tab to grasp or no tab at all. Also, when a plastic bottle cap is used, steps must be taken to ensure that the tab does not seal to the cap, e.g. a secondary paper liner or wax paper liner will need to be used which increases the cost of the package. A major problem is that the manufacturer of a seal with such a tab requires substantially greater processing costs. Thus, either an odd shaped stamping die must be used, or two stamping dies are required, one for the bell shaped tab and one for the seal or body portion itself. Moreover, a second mounting device for assembly is necessary, i.e. one cannot use the same die for both stamping and mounting the seal within the cap. The coordination of this equipment is time consuming, difficult to maintain accurate, and expensive due to the number of operations required on different pieces of material.

French Pat. No. 2,327,1612 shows the manufacture in a single stamping operation of an aluminum foil sesal having a tab, after which the seal is mounted onto the mouth of a tube and sealed thereto by induction heating. While the method of patent solves one of the problems mentioned immediately above, i.e. the problem of the use of either a complex die or separate dies to punch the two portions of the aluminum seal, it does not solve the remaining problems outlined above.

SUMMARY OF THE INVENTION

It is therefore an object of the present invention to overcome deficiencies in the prior art, such as mentioned above.

It is another object of the invention to provide improvements in the provision of tamper evident safety seals.

It is yet another object of the invention to provide an improved tamper evident safety seal having an integral tab making its removal simple and effective, and yet which is inexpensive to manufacture and install.

It is still another object of the invention to provide a tamper evident bottle sealing system which is capable of use in a variety of different situations.

It is a further object of the invention to provide an improved method for making a tamper evident seal with a grasping tab and for installing same.

It is still a further object of the invention to provide an improved tamper evident safety seal having a pull tab of increased strength.

These and other objects and the nature and advantages of the instant invention will be more apparent from the following detailed description of various embodiments of the invention taken in conjunction with the drawing.

BRIEF DESCRIPTION OF DRAWING

FIG. 1 is an exploded perspective view showing a bottle with an improved tamper evident safety seal in accordance with the present invention;

FIG. 2 is greatly enlarged, schematic, cross-sectional view of a standard material from which the improved tamper evident seal of the present invention may be formed;

FIG. 3a is a view similar to FIG. 2 showing a tamper evident seal material of increased strength;

FIG. 3b is a plan view of a scrim material which may be used in the manufacture of the material of FIG. 3a;

FIGS. 10–12 are schematic illustrations showing manufacture and assembly of improved tamper evident safety seals according to the present invention.

DETAILED DESCRIPTION OF EMBODIMENTS

Figure 4:
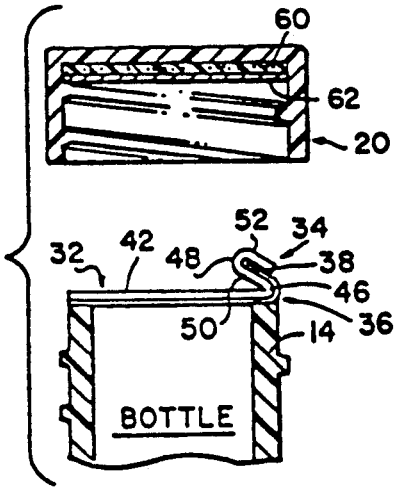
FIGS. 4–9 are schematic, exploded, partial sectional views of various embodiments of the present invention.

With reference to FIG. 1 there is shown a typical bottle 10 having a screw cap 20, the bottle 10 having its mouth sealed with a tamper evident safety seal 30 in accordance with the present invention. The bottle 10 may be conventional, formed of either plastic or glass, and having a body portion 12 and a neck 14 defining at its upper end the bottle mouth and having an external thread 16 and a circumferential bead 18.

The cap 20 may also be of conventional construction, either metal or plastic, but most desirably plastic such as polyethylene or polypropylene. As is conventional, the cap 20 has a top wall 22 and an internally threaded downwardly depending circular side wall 24. The exterior surface of the circular side wall 24 may be desirably knurled or provided with vertically extending ridges and/or grooves to assist the consumer in grasping the cap 20 when screwing it onto or off of the bottle 10.

Figure 5:
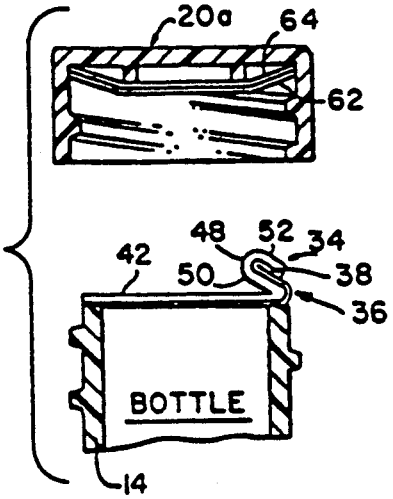

The improved tamper evident safety seal 30 of the invention includes a main body portion 32 having a generally circular periphery and a diameter such as to circumferentially seal the open mouth of the bottle 10. The sealing liner 30 also comprises an integral tab portion 34 connected to the main body portion 32 along a flat section 36. As best seen in FIGS. 1, 4 and 5, because of the section 36, the flexible sealing liner 30 will not extend to the very edge of the end of the bottle neck adjacent this flat section unless the entire safety seal 30 is of greater diameter than the exterior diameter of the bottle neck 14, as is permissible, it being also understood that the remainder of the periphery of the body portion 32 of the sealing liner 30 may extend to the very edge or beyond of the bottle neck because of their co-circular configurations.

FIG. 2 shows in cross-section a typical, conventional material from which the sealing disk 30 of the present invention can be formed. As illustrated, the sealing liner 30a may be formed of a metallic foil layer 38, desirably aluminum foil, provided with polymer coatings 40 on each surface and laminated to a paper layer 42. FIG. 3a shows a material 30b from which a deluxe version of increased strength may be formed including two layers of aluminum foil 38 coated with polymer coatings 40 and having scrim material 44 placed therebetween, and with a paper layer 42 laminated on the surface. The scrim 44 is merely a thin, strong screen-like material suitably formed of a high melting point polymer such as nylon or polyester, which in the present embodiment serves as a reinforcing layer. It will be understood that either during the formation of the laminate 30b itself, or even during sealing of the liner 32 to the bottle 10, the two layers 40 of polymer lying adjacent the scrim 44 will melt and fuse together through the openings in the scrim 44.

It is an important aspect of the present invention that the tab 34 of the sealing liner 30 be double folded as shown in FIGS. 4–9. Thus, the tab portion 34 is folded back along a first hinge line 46 precisely at the flat section 36, the first hinge line 46 defining the separation between the tab portion 34 and the bodyportion 32. The tab portion 34 is then folded again at a second hinge line 48 so as to divide the tab portion 34 into a first folded part 50 and a second folded part 52 thereby defining with the main body portion 32 a Z or S configuration as best shown in FIGS. 4–9.

As is clear from each of FIGS. 4–9, the double fold provides a tab portion 34 of thickness twice as great as the thickness of the body portion 32. Moreover, the paper layer 42 is always on the upper surface, with the polymer coated aluminum layer 38 facing downwardly. During the sealing of the sealing liner 30 to the end of the bottle neck 14, the polymer coated surfaces of the parts 30 and 32 come in contact and also seal together thereby providing the double thick tab portion.

The present configuration provides a number of advantages. It is simple to manufacture and insert into the cap as will be explained in detail below. It is usable in a wide variety of circumstances as discussed below in more detail in regards to FIGS. 4–9. It provides an improved tamper evident safety seal which can be cleanly removed from the bottle, thus allowing spill-free pouring of liquids, and improved ease in discharging pills from a bottle over the edge of the bottle rather than above a "dam" of aluminum in some kind of torn configuration. It obviates sealing of the tab to the interior to a plastic cap or to a plastic liner. And it provides a dependable tab or increased strength.

With regard to the versatility of the present invention, it should be understood that it is desirable for economical purposes to provide a sealing liner which can be used in a variety of environments, rather than having a separate production for each different type of environment. It will also be understood that the fewer layers and pieces, the less expensive the closure becomes. In general there are two types of environments which must be taken into consideration. First is the environment where the contents of the bottles are liquids, and in this case the secondary seals must be liquid tight so that the bottle can be resealed without leakage after the sealing liner has been initially removed. In this regard, attention is invited to FIGS. 4–6.

Figure 6:
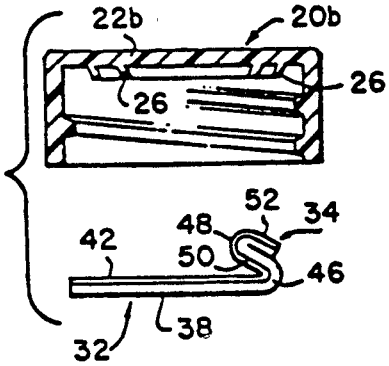

FIG. 4 shows a first possibility where the cap 20 is provided with a laminated liner 60, e.g. a foam material having a skin or surface coating 62, e.g. silicone. Alternatively, the secondary liner 60 can be formed of paper or paperboard. FIG. 5 shows a second embodiment using a special cap 20a and in this case the liner can be formed of relatively thin paper 64 having a silicon or wax surface 62. FIG. 6 shows another possibility using a special cap 20b having one or more circular sealing elements 26 extending downwardly from the inside surface of the top wall 22b; the sealing elements 26 obviate the need for a separate secondary seal.

Figure 7:
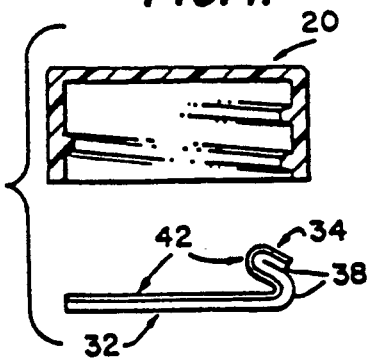
Figure 8:
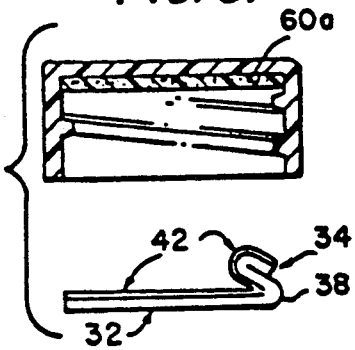
Figure 9:
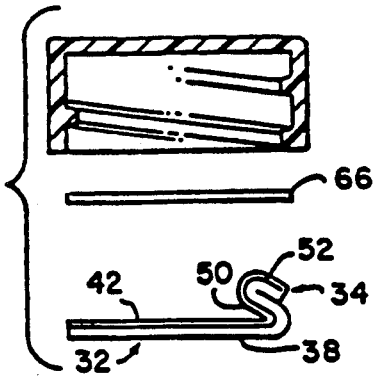

A secondary seal is not needed if the bottle contains pills, powder or the like. Thus, FIG. 7 shows a situation wherein a plastic cap 20 is used without any secondary seal. In certain cases, however, it may be desirable to use a plain foam secondary liner 60a as shown in FIG. 8, or a wax paper or silicone paper secondary liner 66 as shown in FIG. 9. It will be understood that if the second part 52 of the tab 34 were not folded over, the upper surface of the tab would be polymer coated aluminum 38 rather than paper 42, and during the sealing operation the tab would become adhered to the undersurface of the bottle cap top wall at least in the embodiments of FIGS. 6–8.

The advantages of the instant invention in relation to the method of manufacture and assembly will now be explained in conjunction with FIGS. 10–12. First and in general, it should be understood that the sealing liner is initially independent of the bottle and ready to be shipped to the bottler and subsequently assembled mechanically to the bottle by the bottler. The sealing liners must therefore be captured in the bottle caps so that they can be handled either by hand or mechanically. After the bottler has filled the bottle, the cap is mechanically placed on the bottle and securely tightened thereon. The combined closure, i.e. cap and sealing liner, is introduced into a high frequency tunnel, thereby causing the polymer coated aluminum foil to fuse to the upper end of the bottle neck to close the mouth of the bottle, and thereby provide a tamper evident safety seal. When the cap is removed by the customer, the aluminum foil tamper evident seal remains adhered to the bottle with the tab attached for subsequent removal. Normally, the cap will also have a foam or pulp secondary seal as pointed above in order to seal the bottle after the tamper evident seal has been removed.

The present invention provides a method of making a fold back aluminum tab on existing round punch equipment, thereby providing the following advantages. There is no need to duplicate existing installation equipment. The body of the sealing liner is stamped at the same time and with the same round die as the folded over tab portion, so there is no need to align, position, transfer or handle a separate tabbed foil piece. One punching operation serves to punch out the sealing liner and tab, pierce the secondary liner material, e.g. foam or pulp or paperboard, therebelow and transport or force these two seals into a cap stationed below the punch at the end of its stroke. This eliminates operational problems with regard to handling, positioning, etc., and improved accuracy, efficiency, economy and quality of product.

With reference to FIG. 10, a roll 80 of stock material according to FIG. 2 or FIG. 3a is unrolled to provide a layer of stock sealing liner material 82 above a layer 84 of secondary liner stock, e.g. foam unrolling from a roll 86. Both layers 82 and 84 advance at the same rate to a stamping and assembly station 88. Unfilled caps 20 are passed at the same rate below a die 90 while the layers 82 and 84 pass above the die 90 and below a punch 92, it of course being understood that the outer diameter of the punch elements 92 corresponds to the inner diameter of the die 90, and both are of a size so as to form generally circular sealing liners of the necessary diameter to fit within the caps 20 and seal the mouths of the intended bottles.

Noting FIGS. 11a, 11b and 12, it is seen that the foil stock 82 is folded over before the stamping operation along each edge. This folding is shown schematically at location 87 in FIG. 10.

The sized punch 92 pierces through both the foil layer 82 and the foam layer 84 and forces the disk-shaped sealing liners directly into the interior of the cap as best illustrated in FIGS. 11a and 11b. As shown, it is desirable to stamp two circles or seals as shown in FIG. 12, because the second seal can be placed between the edges of the first row of circles, and thereby provide a more economical use of the starting materials.

It should be noted that the position of the aluminum foil 82 in relation to the foam tape 84 is not haphazard. In order to maintain the first hinge 46 so that it will remain intact during the punching operation, it is necessary that the fold line 94 (see FIG. 12), which creates the flat portion 36 and the first hinge line 46 in the sealing liner, be away from the edge 96 of the hole which is to be pierced in the foam 84. The shaded area 98 between the edge 94 and the edge 96 can be no wider than the depth of the bottle thread. It is seen that the shape of the tab portion 34 is complementary to the shape of the body portion 32 of the sealing liner in the area adjacent the first hinge line as defined by the edge 94 in FIG. 12.

It will be obvious to those skilled in the art that various changes may be made without departing from the scope of the invention and the invention is not to be considered limited to what is shown in the drawings and described in the specification.

What is claimed is:

1. A method for forming a sealing liner for a plastic bottle cap, said liner being convertible to an improved tamper evident safety seal for a bottle, said method comprising providing a tape of a polymer coated metal foil laminated to paper;

passing said tape of said flexible laminate of polymer coated metal foil and paper to a folding station;

double folding said laminate tape *at said folding station into a S- or Z-shape configuration;* passing said double folded laminate tape to a stamping and assembly station and between a matching punch and a die such that said folded laminate tape has a *continuous* folded flat edge lying within the periphery of the matching punch and die;

passing bottle caps beneath said die in sequence with said laminate [tap] *tape* and punching a sealing liner from said folded tape and simultaneously forcing same into [a] *an inverted* cap disposed beneath said die.

2. A method according to claim 1 wherein said laminate comprises a first said polymer coated metal foil, a sheet of scrim material and a second polymer coated metal foil, as well as said paper, with said scrim material between said first and second metal foils.

3. A method according to claim 1 wherein said metal foil is aluminum foil.

4. A method according to claim 1 wherein said bottle caps are formed of polyethylene or polypropylene.

5. A method according to claim 1 further comprising providing a tape [or] *secondary* liner material and [continuous] *continuously* passing said *secondary* liner material to said stamping and assembly station below said folded laminate tape, *and wherein said punching and forcing further causes punching of a secondary liner from said tape of secondary liner material and forcing of said secondary liner into said inverted cap beneath said sealing liner.*

6. A method according to 5 wherein said liner is formed of pulp, paperboard or foam plastic.

*7. A method for forming a sealing liner for a bottle cap, said liner being convertible to an improved tamper evident safety seal for a bottle, said method comprising:*

*providing a flexible tape of a sealing liner material laminated to paper;*

*passing said flexible tape of said laminate of sealing liner material and paper to a folding station;*

*longitudinally double folding said flexible tape into a S-shaped or Z-shaped configuration at said folding station;*

*passing said double folded laminate tape to a stamping station and between a matching punch and a die such that said folded laminate tape has a continuous folded flat edge lying within the periphery of the matching punch and die;*

*passing a tape of secondary liner material beneath said die in sequence with said laminate tape; and*

*punching a sealing liner from said folded tape and simultaneously punching a secondary liner from said tape of secondary liner material.*

*8. A method according to claim 7 wherein said laminate comprises a first polymer coated metal foil, a sheet of scrim material and a second polymer coated metal foil, as well as said paper, with said scrim material between said first and second metal foils.*

*9. A method according to claim 7 wherein said flexible tape is aluminum foil.*

*10. A method according to claim 7, wherein said secondary liner is formed of pulp, paperboard or foam plastic.*

*11. A method according to claim 7, wherein said longitudinal folding is carried out to provide two longitudinally extending folded flat edges.*

*12. A method according to claim 7 wherein said flexible tape of sealing liner material is a laminate of polymer-coated metal foil and paper.*

* * * * *